| United States Patent [19] | [11] Patent Number: 5,004,709 |
| --- | --- |
| Stranford et al. | [45] Date of Patent: Apr. 2, 1991 |

[54] HIGH SURFACE AREA SILICON NITRIDE AND USE THEREOF

[75] Inventors: Gerald T. Stranford, Palatine; Stephen T. Gonczy, Mt. Prospect; Roy T. Mitsche, Wauconda, all of Ill.

[73] Assignee: Allied-Signal Inc., Morris Township, Morris County, N.J.

[21] Appl. No.: 324,132

[22] Filed: Mar. 16, 1989

[51] Int. Cl.$^5$ .................. C04B 35/56; C04B 35/58
[52] U.S. Cl. ................................ 501/97; 501/98; 502/263
[58] Field of Search ............. 501/98, 92, 80; 502/263, 304; 423/344

[56] References Cited

U.S. PATENT DOCUMENTS

| 3,993,572 | 11/1976 | Hindin et al. | 252/402 |
| 4,332,909 | 6/1982 | Nishida et al. | 501/97 |
| 4,365,022 | 12/1982 | Tabata et al. | 501/97 |
| 4,629,707 | 12/1986 | Wolfe | 501/97 |
| 4,716,133 | 12/1987 | Horiuchi et al. | 501/97 |
| 4,904,624 | 2/1990 | Yeckley | 501/97 |

*Primary Examiner*—William R. Dixon, Jr.
*Assistant Examiner*—Alan Wright
*Attorney, Agent, or Firm*—Frank S. Molinaro; Harold N. Wells; Roger H. Criss

[57] ABSTRACT

This invention relates to a ceramic article having a crystalline and continuous silicon nitride phase, iron and a rare earth oxide, the article having a surface area of at least 3.5 m$^2$/g, a thermal expansion coefficient smaller than $6 \times 10^{-6}$ m/m/°C. measured in the range 20°-800° C. and a porosity of at least 30%. The ceramic article may also contain a discrete porous oxide phase such as alumina, aluminates, silica, spinel, titania, zirconia, zeolites and mixtures thereof. Further, the porous oxide may also contain a metal oxide such as barium oxide, nickel oxide, iron oxide, rare earth oxides and mixtures thereof. The ceramic article may be used as a catalyst support. Methods of manufacturing the ceramic article are also disclosed.

32 Claims, No Drawings

HIGH SURFACE AREA SILICON NITRIDE AND USE THEREOF

Silicon nitride ($Si_3N_4$) articles are well known in the art. These articles are usually dense, highly sintered materials which have superior characteristics such as mechanical strength, heat resistance and corrosion resistance. However, porous silicon nitride articles also find application as rotating or oscillating shafts and bearings.

The silicon nitride is formed by reacting silicon with nitrogen at temperatures above 1300° C. Once the silicon nitride is formed, sintering to full density is carried out at temperatures above 1500° C. either with or without sintering aids. Thus, U.S. Pat. No. 4,716,133 discloses that a Group IIIa metal may be used as a sintering aid. Similarly, U.S. Pat. No. 4,628,039 discloses that a Group IIIa metal oxide and an oxide or nitride of at least one element from Group IIa, Al, Ti, Cr, Ga, Zr or Si are good sintering agents. Further, U.S. Pat. No. 4,629,707 discloses that a porous silicon nitride material (at least 37% porous) can be prepared by using yttrium oxide as the sintering aid.

In contrast to this prior art, applicants have discovered a process which lowers the nitridation temperature substantially. Applicants' process involves adding iron and a rare earth oxide to the silicon. Using this process applicants have been able to achieve over 30% nitridation at temperatures as low as 1150° C. Applicants are the first to achieve such a result. To applicants' knowledge there is only one report in the prior art regarding nitriding accelerators other than iron: U.S. Pat. No. 4,521,358. The '358 patent discloses that chromium may be used to accelerate nitridation. However, even using chromium the '358 patent shows that only about 20% nitridation occurs at 1250° C. Applicants' use of iron and a rare earth oxide gives a higher percent of nitridation at a lower temperature. The result of applicants' discovery is that silicon nitride articles can be formed at lower temperatures providing articles with new properties such as increased surface area and high porosity. This in turn provides new uses for these articles.

One such use is as a catalyst support. Catalysts are employed in a number of processes ranging from refining crude oil to treating waste streams. These catalysts usually comprise one or more catalytic metals deposited on a support which has a high surface area and high porosity. These support properties are necessary in order to have a catalyst with high activity and good durability. The support is generally a refractory inorganic oxide which may be utilized in a number of configurations, shapes and sizes. For example the support may be formed in the shape of spheres, extrudates, irregularly shaped granules, etc. or the support may be deposited as a layer onto a rigid structure such as a metal or ceramic honeycomb monolithic structure.

The use of a honeycomb monolithic structure has been the preferred configuration in treating exhaust gases, e.g., from automotive engines, because it reduces the weight of the catalyst and minimizes the amount of back pressure on the engine. Typically, a honeycomb monolithic structure composed of a polycrystalline cordierite phase which has a surface area less than 1 $m^2/g$ is used. Cordierite is used because of its good strength and thermal shock resistance. However, treating an exhaust stream with a catalyst consisting of a cordierite monolithic structure which has been coated with a support containing catalytic metals does have some drawbacks. One drawback is that the thermal expansion coefficient of cordierite is different than that of the support. Therefore, during thermal cycling some of the support, which contains the catalytic metals, can flake off and be carried off in the exhaust stream. This deteriorates the activity of the catalyst. The exhaust gases also contain dust or particulate matter which can cause the high surface area support to flake off and be carried off. These problems could be eliminated if the monolithic structure had a high surface area such that the catalytic metals could be deposited on the monolithic structure without using a support. Eliminating the support coating would also represent an economic advantage because a processing step would be eliminated.

This problem has received some attention in the art and some solutions have been proposed. The solutions have centered on adding a high surface area porous oxide phase to the ceramic phase, e.g., cordierite. For example, U.S. Pat. No. 4,631,268 to Lachman et al. discloses a monolithic structure having a substantially continuous high strength ceramic phase selected from the group consisting of cordierite, mullite, clay, talc, zirconia, zirconia-spinel, alumina, silica, lithium aluminosilicates, alumina-zirconia and mixtures thereof and a discontinuous high surface area porous phase selected from alumina, silica, spinel, titania, zirconia, zeolite, and mixtures thereof.

U.S. Pat. Nos. 4,657,880 and 4,637,995 disclose similar materials with minor modifications. In all three of these patents, the high surface area is contributed by a porous oxide. Additionally, U.S. Pat. No. 4,631,267 discloses a high surface area monolithic structure composed of a high surface area porous oxide phase and a permanent binder. The porous oxide phase is selected from the group consisting of alumina, silica, zeolite, and spinels. The above patents disclose and claim that the resulting monolithic structures can be used as catalyst supports without the use of a separate support layer deposited on the monolithic structure.

There are also two reports of using silicon nitride as a catalyst support. These are Japanese Public Disclosure No. 89949/83 and British Patent No. 1,426,216. Both of these references disclose depositing metals onto a silicon nitride support for use in treating automotive exhaust.

In contrast to the above references applicants have produced a catalytic composite in which the support comprises a crystalline and continuous silicon nitride phase, iron, and a discrete porous oxide phase. This support has a surface area of at least 3.5 $m^2/g$ and a porosity of at least 30%. One advantage to applicants' invention is that when alumina is the desired porous oxide, carrying out the nitridation at temperatures as low as 1150° C. results in the alumina remaining in the gamma phase instead of sintering to a more dense phase such as delta or alpha. It is well known that catalytic metals dispersed on gamma alumina have higher activity than when these metals are dispersed on delta or alpha alumina.

SUMMARY OF THE INVENTION

This invention relates to a ceramic article, a method of preparing the ceramic article and a method of using the ceramic article. The ceramic article comprises a crystalline and continuous silicon nitride phase, iron and a rare earth oxide, said article having a surface area of at least 3.5 $m^2/g$, a thermal expansion coefficient smaller than $6 \times 10^{-6}$ m/m/°C. measured in the range 20°-800° C. and a porosity of at least 30%.

Thus, one specific embodiment comprises a ceramic article in the shape of a monolithic honeycomb structure comprised of a crystalline and continuous silicon nitride phase, iron and cerium oxide.

Another embodiment of the invention is a ceramic article comprising a crystalline and continuous silicon nitride phase, iron, a rare earth oxide and a discrete porous oxide phase selected from the group consisting of alumina, aluminates, silica, spinel, titania, zirconia, zeolites and mixtures thereof, the article having a surface area of at least 3.5 m²/g, a thermal expansion coefficient smaller than $6 \times 10^{-6}$ m/m/°C. measured in the range 20°-800° C., and a porosity of at least 30%.

Another embodiment of the invention is a method of preparing a ceramic article comprising reacting a shaped mixture of silicon, iron, a porous oxide containing a metal oxide and a binder with nitrogen at a temperature and for a time sufficient to form a ceramic article comprising a substantially crystalline and continuous silicon nitride phase, iron and a discrete porous oxide phase containing a metal oxide, having a surface area of at least 3.5 m²/g, a thermal expansion coefficient smaller than $6 \times 10^{-6}$ m/m/°C. measured in the range 20°-800° C. and a porosity of at least 30%.

Yet another embodiment of the invention is a catalytic composite comprising a support having dispersed thereon at least one noble metal component selected from the group consisting of platinum, palladium, rhodium, ruthenium, iridium and mixtures thereof, the support characterized in that it comprises a substantially crystalline and continuous silicon nitride phase, iron and a discrete porous oxide phase selected from the group consisting of alumina, aluminates, silica, spinel, titania, zirconia, zeolites and mixtures thereof, said support having a surface area of at least 3.5 m²/g, a thermal expansion coefficient smaller than $6 \times 10^{-6}$ m/m/°C. measured in the range 20°-800° C. and a porosity of at least 30%.

Still another embodiment of the invention is a method of preparing a ceramic article comprising reacting a shaped mixture of silicon, iron, a rare earth oxide and a binder with nitrogen at a temperature and for a time sufficient to form a ceramic article comprising a crystalline and continuous silicon nitride phase, iron and a discrete rare earth oxide phase, the article having a surface area of at least 3.5 m²/g, a thermal expansion coefficient smaller than $6 \times 10^{-6}$ m/m/°C. measured in the range of 20°-800° C. and a porosity of at least 30%.

A further embodiment of the invention is a method of treating waste gases comprising contacting the waste gases with the catalytic composite described above.

Other objects and embodiments will become more apparent in the following detailed description.

DETAILED DESCRIPTION OF THE INVENTION

As heretofore indicated, the present invention relates to a ceramic article and a method of preparing said article. One essential feature of the article is a continuous silicon nitride phase. The silicon nitride phase is prepared in situ from silicon and nitrogen and characterized as shown herein. The silicon nitride phase will also contain iron and a rare earth oxide which are primarily added to increase the nitridation rate of silicon to silicon nitride. Illustrative of the rare earth oxides which can be used are cerium oxide, lanthanum oxide, praesodymium oxide, neodymium oxide, europium oxide, holmium oxide, and dysprosium oxide, with cerium oxide being preferred.

An optional component of the ceramic article is a discrete porous oxide phase. The porous oxide phase is selected from the group consisting of alumina, aluminates, silica, spinel, titania, zirconia, zeolites and mixtures thereof, with alumina being preferred. It is desirable that these porous oxides have an initial surface area of at least 10 m²/g and preferably at least 100 m²/g. Further, the porous oxide may optionally contain a metal oxide selected from the group consisting of barium oxide, iron oxide, nickel oxide, the rare earth oxides and mixtures thereof. The metal oxides serve several functions such as increasing the nitridation rate, stabilizing the porous oxide and promoting the activity of catalytic metals which may be deposited on the silicon nitride.

The ceramic article may be in the form of various shapes and sizes such as extrudates, pills, pellets, granules, rings, spheres and monolithic form, with monolithic form being preferred.

Another embodiment of the invention is a method of preparing a ceramic article. The basic process involves reacting a shaped mixture of silicon, iron, a binder and a rare earth oxide with nitrogen (nitridation reaction) at a temperature and for a time sufficient to form silicon nitride.

The mixture of silicon, iron, binder and a rare earth oxide may be prepared by means well known in the art. Accordingly, it is desirable that the silicon be in the form of a powder with an average particle size of less than 10 microns. This ensures good mixing with the other components and increases the nitridation rate. Iron is mixed with the silicon to accelerate the nitridation reaction and to lower the temperature at which nitridation occurs. The iron may be mixed with the silicon in a number of ways, provided that it is evenly distributed throughout the silicon. One method of distributing the iron throughout the silicon is to mix the iron and silicon using conventional mixers such as ball mills, V blenders, etc. A preferred method is to impregnate the iron onto the silicon. The impregnation is carried out under a dry nitrogen atmosphere using anhydrous solvents. Thus, a silicon powder is contacted with a solution of an iron compound for a period of time from about 10 to about 120 minutes and the impregnated silicon filtered. The solvent used to prepare the iron compound solution may be selected from the group consisting of ethyl ether, diglyme, acetone or ethyl alcohol. The iron compound may be any compound which is soluble in any of the above solvents. Illustrative examples are iron chloride, iron acetate, iron acetylacetonate, iron bromide, iron carbonyl, iron perchlorate, iron fluoride, iron iodide, and iron nitrate.

When the silicon has been impregnated with an iron compound, it is dried at a temperature of about 70° to about 110° C. The dried mixture may be further heated under an inert atmosphere, e.g., nitrogen or argon, at a temperature of about 400° to about 700° C. for a time of about 1 to about 10 hours in order to decompose the iron compound. Alternatively, the dried silicon/iron compound mixture may be processed as described infra and the iron compound decomposed during the initial heating of the nitridation step. The amount of iron which is added to the silicon can vary from about 0.05 to about 2 weight percent of the silicon and preferably from about 0.1 to about 1 weight percent, based on elemental iron.

A rare earth oxide component is now added to the silicon/iron mixture. As stated, illustrative of the rare earth oxides which can be used are cerium oxide, lanthanum oxide, praesodymium oxide, neodymium oxide, europium oxide, holmium oxide, and dysprosium oxide, with cerium oxide being preferred. Applicants have discovered a synergistic effect between the rare earth oxides and iron which results in nitridation occurring at a temperature as low as 1000° C. and virtually complete nitridation occurring at 1300° C. The amount of rare earth oxide which is added can vary from about 1 to about 25 weight percent of the silicon and preferably from about 1 to about 5 weight percent. The rare earth oxide is evenly distributed throughout the silicon/iron mixture by conventional means such as ball mills, V blenders, etc.

The mixture above is now mixed with enough binder or binding agent to form a moldable mass. Generally, an amount of binding agent from about 5 to about 20 weight percent of the silicon is adequate to form a moldable mass. The binding agent may be any agent well known in the art. Preferred agents are methyl cellulose, polyvinyl alcohol, silicone resins, polyethylene oxide, starch, acrylics, hydroxypropyl methyl cellulose, hydroxyethyl cellulose and guar gum. Up to about 1 percent by weight based upon the total body weight of a surfactant or lubricant such as sodium stearate, zinc stearate, magnesium stearate or stearic acid can also be used to facilitate mixing and forming. The mixing step should be performed in a liquid, preferably water, which acts as a further binder or plasticizer. Conventional mixing equipment can be used to form the mixture into a moldable mass.

The moldable mass or batch can now be formed into a desired shape by methods well known in the art. Illustrative of these methods are pressing and extrusion. For example, the moldable mass may be passed through an extrusion die to form a honeycomb monolithic body. Such an extrusion die and process is presented in U.S. Pat. No. 4,747,986 which is incorporated herein by reference. The honeycomb body is characterized by a plurality of open cells with thin walls. The shape of the cells may be square, circular, rectangular, triangular, hexagonal, etc. Typically the honeycomb walls will have a thickness of between about 0.07 mm to about 1.3 mm with cell densities of between about 8 cells/cm$^2$ to about 140 cells/cm$^2$. Other methods of forming a honeycomb shape are rolling and pressing of sheets which can be assembled into a honeycomb monolithic structure.

Having obtained an article in the desired shape, e.g., honeycomb monolith, the next step in the process is to dry the article. The article is dried between 80° C. and 100° C. and then slowly heated in a non-oxidizing atmosphere such as nitrogen, argon or helium to a temperature of about 700° C. to remove the binder. The drying step need not be a separate step, but may be combined with the nitriding step which is described next.

The dried article is now reacted with nitrogen to form reaction bonded silicon nitride. The silicon nitride is formed by heating the article under a nitrogen atmosphere at a temperature of about 1000° C. to about 1450° C., preferably from about 1100° C. to about 1300° C. and a pressure of about 0.1 to about 100 MPa for a period of time from about 1 to about 30 hours. Although a pure nitrogen atmosphere is adequate it is preferable that hydrogen be included in the nitrogen atmosphere to increase the nitridation rate. The amount of hydrogen can vary considerably but is conveniently chosen to be from about 4 to about 10 volume percent.

If one wishes to increase the surface area of the article, then a porous oxide phase may also be added to the article. The porous oxides which may be used are those selected from the group consisting of alumina, aluminates, silica, spinel, titania, zirconia, zeolite and mixtures thereof. By aluminate is meant a complex oxide having formulae such as $CeAlO_3$, $CeAl_{11}O_{18}$, $LaAlO_3$, $Ba(AlO_2)_{21}$, etc. The form of the porous oxide is a powder having an average particle size of about 10 microns. A homogeneous mixture of the silicon, iron, rare earth oxide and porous oxide is prepared prior to the addition of the binding agent. This homogeneous mixture may be prepared by the use of conventional mixing means such as ball mills, V blenders, sigma blade mixers, etc. The amount of porous oxide which is added to the silicon can vary from about 5 to about 50 weight percent and preferably from about 10 to about 40 weight percent of the silicon.

In an especially preferred embodiment of the invention, the porous oxide also contains a metal oxide selected from the group consisting of barium oxide, iron oxide, nickel oxide, the rare earth oxides and mixtures thereof. Illustrative of the rare earth oxides which can be used are cerium oxide, lanthanum oxide, praesodymium oxide, neodymium oxide, europium oxide, holmium oxide, yttrium oxide and dysprosium oxide. The desired oxide or mixture of oxides are evenly dispersed on the porous oxide by means well known in the art such as impregnation of the alumina with a solution of a metal compound, followed by drying and calcining in air. Details of the means of dispersing the metal oxide onto the alumina may be found in U.S. Pat. No. 4,760,044 which is incorporated herein by reference. The amount of metal oxide present in the porous oxide may vary considerably from about 5 to about 50 weight percent of the porous oxide and preferably from about 10 to about 35 weight percent. It should be pointed out that when a rare earth oxide is dispersed on the porous oxide, it is unnecessary to add the rare earth oxide as a separate phase in order to obtain the synergistic effect with the iron.

After the porous oxide (with or without a metal oxide) is mixed with the silicon, the resulting mixture is processed as described above. After the article is heated at about 1000° C. to about 1450° C. and preferably at about 1100° C. to about 1300° C., the resultant ceramic article is characterized in that it is composed of a crystalline silicon nitride phase, iron and a discrete porous oxide phase. Regardless of whether the ceramic article contains a porous oxide phase or not, it is characterized by the following properties. The finished ceramic article has a surface area of at least 3.5 m$^2$/g. The ceramic article has a thermal expansion coefficient smaller than $6 \times 10^{-6}$ m/m/°C. measured in the range 20°-800° C. and a porosity of at least 30%. The average pore size is in the range of about 12.5 to about 1,500 nm.

Ceramic articles prepared in this manner may have thermal expansion coefficients substantially lower than the expansion coefficients of the component phases. These low expansion coefficients probably arise from microstructural effects.

Another embodiment of the invention is a catalytic composite comprising a support having dispersed thereon at least one noble metal component selected from the group consisting of platinum, palladium, rhodium, ruthenium, iridium and mixtures thereof. The support is a ceramic article composed of a crystalline and continuous silicon nitride phase, iron and a discrete porous oxide phase (preferably containing a metal oxide) as described above. The catalyst support may be in the form of various shapes and sizes such as extrudates, pills, pellets, granules, rings, spheres and honeycomb monolithic form, with monolithic form being preferred.

The noble metal component may be deposited onto the support in any suitable manner well known in the art. One example of a method of dispersing the noble metal component onto the support involves impregnating the support with an aqueous solution of a decomposable compound of the desired noble metal or metals. Illustrative of the decomposable compounds of the noble metals are chloroplatinic acid, ammoniumchloroplatinate, hydroxydisulfite platinum (II) acid, bromoplatinic acid, platinumtetrachloride hydrate, dinitrodiamino platinum, sodium tetranitroplatinate, rhodium trichloride, hexaaminerhodiumchloride, rhodium carbonylchloride, rhodium trichlorodihydrate, rhodium nitrate, sodium hexachlororhodate, sodium hexanitrorhodate, chloropalladic acid, palladium chloride, palladium nitrate, diamine palladium hydroxide, tetraaminepalladium chloride, hexachloroiridate (IV) acid, hexachloroiridate (III) acid, dichlorodihydrooxoiridate (III) acid, ammonium hexachloroiridate (III), ammonium aquohexachloroiridate (IV), tetraaminedichloroiridate (III) chloride, aquotetraamineiridate (III) chloride, ruthenium tetrachloride, hexachlororuthenate, and hexaamineruthenium chloride.

When more than one noble metal is desired, the metals can be in a common aqueous solution or in separate aqueous solutions. When separate aqueous solutions are used, impregnating of the silicon nitride support with the noble metal solutions can be performed sequentially in any order.

The actual impregnation procedure involves either dipping the silicon nitride support into the solution containing the noble metal compound and then drying and calcining in air at a temperature of about 400° to about 500° C. for a time of about 1 to about 4 hours.

In order for the catalytic composite to have sufficient activity, it is desirable that the noble metal component be present in an amount ranging from about 0.01 to about 4 weight percent of the support. Specifically, in the case of platinum and palladium the range is from about 0.1 to about 4 weight percent and in the case of rhodium, ruthenium and iridium the range is from about 0.01 to about 2 weight percent.

It is also an embodiment of the instant invention to provide a process for the treatment of exhaust gases from an internal combustion engine comprising contacting the exhaust gases with the catalytic composite described hereinabove. This process is usually accomplished by placing the catalytic composite in a container, known in the art as a converter, which is then placed in the exhaust system of the automobile. The composition of the exhaust gas can vary depending on the amount of air and fuel (A:F ratio) which is supplied to the engine. If excess air is supplied to the engine, then the exhaust gas will contain excess oxygen, i.e., net oxidizing conditions, and the catalytic composite will oxidize the hydrocarbons and carbon monoxide contained in the exhaust gas to carbon dioxide and water. When excess fuel is supplied to the engine, e.g., under hard accelerations, the exhaust gas will contain excess fuel components, i.e., net reducing conditions, and the catalytic composite will reduce the nitric oxide to nitrogen and oxygen. If the amount of air and fuel is adjusted to provide the stoichiometric amount of air required to combust the fuel, then the A:F ratio of the exhaust will also be stoichiometric and the catalytic composite will simultaneously oxidize the hydrocarbons and carbon monoxide and reduce the nitric oxide.

Engines are currently equipped with control systems that will maintain the A:F ratio at or near the stoichiometric point. These control systems operate by using an oxygen sensor which detects the presence of excess oxygen in the exhaust gas. Thus, the A:F ratio actually oscillates about the stoichiometric point. The catalyst of the instant invention is able to operate within this range or window of A:F ratio.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

In a container there were mixed 21.6 grams of silicon (Kema Nord Grade IV, Size C) and 5.84 grams of alumina containing 20% ceria. The ceria was dispersed on the alumina (Kaiser Aluminum Co.) by impregnating the alumina with an aqueous cerium acetate solution, followed by calcining at 540° C. for about 1 hour. The mixture contained 80% silicon, 16% alumina and 4% ceria on a volatile free basis. Three grams of methylcellulose were then mixed with 27 grams of the silicon/alumina/ceria mixture. Cylindrical samples about 1 cm long by 1 cm diameter were formed by dry pressing 2.25 g portions of the powder binder mixture at 70 MPa. Samples were nitrided at 1150°, 1300°, and 1450° C. by heating at 180° C./hr to the desired temperature in flowing nitrogen/4% hydrogen atmospheres (500 cc/min). After holding at temperature for 8 hours, the furnace was cooled at 180° C./hr under flowing nitrogen/4% hydrogen. Percent conversion, porosities, and expansion coefficients are summarized in Table A.

EXAMPLE II

In a nitrogen atmosphere in a glove box, 60.65 g of $FeCl_3$ (Cerac Co.) were added to 352 mL of ethyl ether (Mallinkrodt Co.). After stirring for 80 minutes, the solution was filtered through a fritted glass filter which collected 11 g of undissolved material. One hundred grams of silicon powder were added to the filtered solution. After stirring for one hour, the silicon was isolated from the solution by filtering through a 1.2 micron nylon filter membrane. The powder was dried at 80° C. in air. Iron contents of the as-received and iron treated silicon were measured using inductively coupled plasma atomic emission spectroscopy. Samples were prepared for analysis by dissolution in nitric and hydrofluoric acids. The untreated sample contained 289 ppm (by weight) iron while the iron treated silicon had 1.15 weight percent iron.

EXAMPLE III

Two grams of methylcellulose were blended with 18 g of the iron doped silicon powder prepared in Example II. Cylindrical samples about 1 cm long by 1 cm diameter were formed by dry pressing 2.25 g portions of the powder binder mixture at 70 MPa. Samples were nitrided at 1150°, 1300°, and 1450° C. by heating at 180° C./hr to the desired temperature in flowing nitrogen/4% hydrogen atmospheres (500 cc/min). After holding at temperature for 8 hours, the furnace was cooled at 180° C./hr under flowing nitrogen/4% hydrogen. Percent conversion, porosities, and expansion coefficients are summarized in Table A.

EXAMPLE IV

Twenty-seven grams of the iron doped silicon powder of Example II were mixed with 5.84 g of alumina containing ceria (same as Example I). Cylindrical samples about 1 cm long by 1 cm diameter were formed by dry pressing 2.25 g portions of the powder binder mixture at 70 MPa. Samples were nitrided at 1150°, 1300°, and 1450° C. by heating at 180° C./hr to the desired temperature in flowing nitrogen/4% hydrogen atmospheres (500 cc/min). After holding at temperature for 8 hours, the furnace was cooled at 180° C./hr under flowing nitrogen/4% hydrogen. Percent conversion, porosities, and expansion coefficients are summarized in Table A.

TABLE 1-continued

| Gas Component | Laboratory Gas Composition | |
|---|---|---|
| | Lean Gas (ppm) | Rich Gas (ppm) |
| $N_2$ | Balance | Balance |

The lean and rich gas mixtures were oscillated at a frequency of 0.5 Hertz.

The catalyst was tested by heating the catalyst from 150° to 600° C. while passing the above oscillating gas over the catalyst. The gas stream at the inlet and outlet of the reactor was analyzed and a conversion efficiency calculated for carbon monoxide, hydrocarbon and nitric oxide. The temperature at which these conversions reached 25, 50 and 75% are presented in Table 2.

TABLE 2

| Activity of Catalyst Prepared According to the Invention | | | |
|---|---|---|---|
| Component | T25* | T50* | T75* |
| HC | 325 | 341 | 420 |
| CO | 304 | 317 | 327 |
| $NO_x$ | 293 | 315 | 340 |

*Temperature °C. required to reach stated conversion.

TABLE A

| | | Physical Properties of Silicon Nitride Ceramics | | | | |
|---|---|---|---|---|---|---|
| Initial Composition | Reaction Temperature °C. | Percent Conversion to Silicon Nitride | Apparent Porosity (%) | Pore Area $m^2/g$ | Mean Pore Size nm | Expansion Coefficient ppm/°C. (200-800° C.) |
| Si/$Al_2O_3$/$CeO_2$ | 1150 | 7 | 55 | 28.0 | 717 | — |
| Si/$Al_2O_3$/$CeO_2$ | 1300 | 42 | 51 | 10.9 | 601 | — |
| Si/$Al_2O_3$/$CeO_2$ | 1450 | 83 | 49 | 4.3 | 1501 | — |
| Si/Fe | 1150 | 6 | 46 | 8.3 | 739 | — |
| Si/Fe | 1300 | 74 | 39 | 12.0 | 131 | 2.8 |
| Si/Fe | 1450 | 89 | 38 | 4.0 | 523 | — |
| Si/Fe/$Al_2O_3$/$CeO_2$ | 1150 | 35 | 52 | 19.1 | 267 | 3.9 |
| Si/Fe/$Al_2O_3$/$CeO_2$ | 1300 | 90 | 46 | 7.1 | 360 | 1.8 |
| Si/Fe/$Al_2O_3$/$CeO_2$ | 1450 | 92 | 45 | 3.6 | 866 | 5.5 |

EXAMPLE V

Silicon nitride pellets containing iron, alumina and ceria were prepared as per Example IV except that the pellets were nitrided at 1300° C. The nitrided disks were then ground into coarse particulates between 40 and 20 mesh (425 to 850 microns).

A portion of the above particulate support (8.5 g) was impregnated by placing the support in a rotary evaporator and adding to it 25 mL of an aqueous solution containing 6 mg of rhodium as rhodium chloride and 31 mg of platinum as chloroplatinic acid. The impregnated support was dried and then heated in air at 600° C. for six hours.

One gram of the above catalyst was placed in a reactor which in turn was placed in a vetical furnace over which the gases in Table 1 were flowed. The gas mixtures simulate exhaust from an automotive engine oscillating about the stoichiometric point.

TABLE 1

| Gas Component | Laboratory Gas Composition | |
|---|---|---|
| | Lean Gas (ppm) | Rich Gas (ppm) |
| $O_2$ | 6500 | 2790 |
| CO | 3550 | 8000 |
| $H_2$ | 1183 | 2667 |
| $C_3H_8$ | 355 | 800 |
| $C_3H_6$ | 500 | 500 |
| NO | 1835 | 1835 |
| $CO_2$ | 118800 | 118800 |
| $SO_2$ | 20 | 20 |
| $H_2O$ | 10 vol. % | 10 vol. % |

As the results in Table 2 show, the instant catalyst is quite active in treating a simulated automotive exhaust gas.

What is claimed is:

1. A ceramic article formed by reacting a shaped mixture comprising a major portion of silicon and a minor portion of iron and rare earth oxide with nitrogen at a temperature and for a time sufficient to form a crystalline and continuous silicon nitride phase, the article having a surface area of at least 3.5 $m^2/g$, a thermal expansion coefficient smaller than $6 \times 10^{-6}$ m/m/°C. measured in the range of 20°-800° C. and a porosity of at least 30%.

2. The ceramic article of claim 1 where the article is in the shape of a honeycomb monolithic structure.

3. The ceramic article of claim 1 where the iron is present in a concentration from about 0.05 to about 2 weight percent of the silicon.

4. The ceramic article of claim 1 where the rare earth oxide is cerium oxide and is present in a concentration from about 1 to about 25 weight percent of the silicon.

5. The ceramic article of claim 1 further characterized in that said article selected from the group consisting of alumina, aluminates, silica, spinel, titania, zirconia, zeolites and mixtures thereof.

6. The ceramic article of claim 5 where the porous oxide is present in a concentration from about 5 to about 50 weight percent of the silicon.

7. The ceramic article of claim 5 where the porous oxide is alumina.

8. The ceramic article of claim 5 further characterized in that the porous oxide contains a metal oxide selected from the group consisting of barium oxide, iron oxide, the rare earth oxides and mixtures thereof.

9. The ceramic article of claim 8 where the metal oxide is present in an amount from about 5 to about 50 weight percent of the porous oxide.

10. A method of preparing a ceramic article comprising reacting a shaped mixture of a major portion of silicon and a minor portion of iron and a porous oxide containing a metal oxide and a binder with nitrogen at a tempeature and for a time sufficient to form a ceramic article comprising a crystalline and continuous silicon nitride phase, the article havng a surface area of at least 3.5 m$^2$/g, a thermal expansion coefficient smaller than $6 \times 10^{-6}$ m/m/°C. measured in the range 20°–800° C. and a porosity of at least 30%.

11. The method of claim 10 further characterized in that the mixture is in the shape of a honeycomb monolithic structure.

12. The methodj of claim 10 where the iron is present in a concentration from about 0.05 to about 2 weight percent of the silicon.

13. The method of claim 10 where the porous oxide is slected from the group consisting of alumina, aluminates, silica, spinel, titania, zerconia, zeolites and mixture thereof and is present in the mixture in an amount from about 5 to about 50 weight percent of the silicon.

14. The method of claim 13 where the porous oxide is alumina.

15. The method of claim 10 where the metal oxide is selected from the group consisting of barium oxide, iron oxide, nickel oxide, the rare earth oxides, and mixtures thereof, said metal oxide present in a concentration from about 5 to about 50 weight percent of the porous oxide.

16. The method of claim 15 where the rare earth oxide is cerium oxide.

17. The method of claim 15 where the rare earth oxide is lanthanum oxide.

18. The method of claim 10 where the binder is selected form the group consisting of methylcellulose, polyethylene oxide, polyvinyl alcohol, starch, acrylics, hydroxypropyl methyl cellulose, hydroxyethyl cellulose, silicone resins and guar gum and is present in the mixture in an amount from about 5 to about 20 weight percent.

19. The method of claim 10 where the mixture is heated at a temperature of about 1000° to about 1450° C. for a time from about 1 to about 30 hours.

20. A method of preparing a ceramic article comprising reacting a shaped mixture of a major portion of silicon and a minor portion of iron and a rare earth oxide and a binder with nitrogen at a temperature and for a time sufficient to form a ceramic article comprising a crystalline and continuous silicon nitride phase, the article having a surface area of at least 3.5 m$^2$/g, a thermal expansion coefficient smaller than $6 \times 10^{-6}$ m/m/°C. measured in the range 20°–800° C. and a porosity of at least 30%.

21. The method of claim 20 further characterized in that the mixture is in the shape of a honeycomb monolithic structure.

22. The method of claim 20 where the iron is present in a concentration from about 0.05 to about 2 weight percent of the silicon.

23. The method of claim 20 where the rare earth oxide is present in a concentration from about 1 to about 25 weight percent of the silicon.

24. The method of claim 20 where the rare earth oxide is cerium oxide.

25. The method of claim 20 where the rare earth oxide is lanthanum oxide.

26. The method of claim 20 where the binder is selected from the group consisting of methylcellulose, polyethylene oxide, polyvinyl alcohol, starch, acrylics, hydroxypropyl methyl cellulose, hydroxyethyl cellulose, silicone resins and guar gum and is present in the mixture in an amount from about 5 to about 20 weight percent.

27. The method of claim 20 where the mixture is heated at a temperature of about 1000° to about 1450° C. for a time from about 1 to about 30 hours.

28. The method of claim 20 further characterized in that said mixture also contains a porous oxide selected from the group consisting of alumina, aluminates, silica, spinel, titania, zirconia, zeolites and mixtures thereof.

29. The method of claim 28 where the porous oxide is present in a concentration from about 5 to about 50 weight percent of the silicon.

30. The method of claim 28 where the porous oxide is alumina.

31. The method of claim 28 further characterized in that the porous oxide contains a metal oxide selected from the group consisting barium oxide, iron oxide, the rare earth oxides and mixtures thereof.

32. The method of claim 31 where the metal oxide is present in an amount from about 5 to about 50 weight percent of the porous oxide.

* * * * *